Aug. 28, 1956  H. L. THOMAS  2,760,819
IRRIGATING AND FERTILIZING DEVICE
Filed May 5, 1954
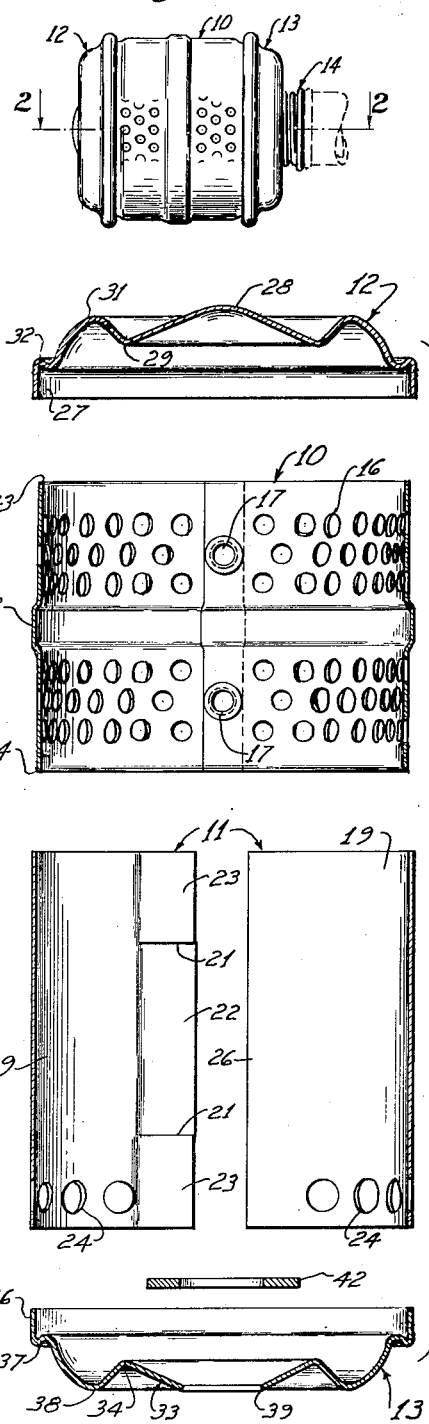
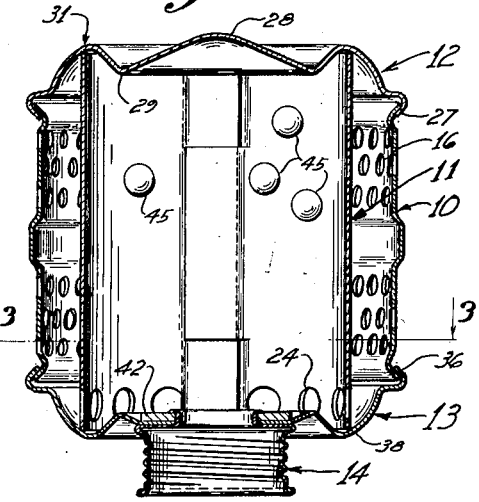
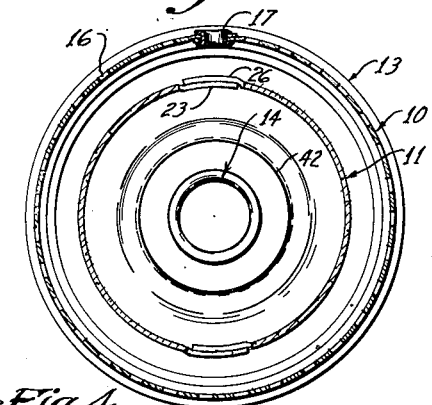
INVENTOR.
Harry L. Thomas
BY
John J. McLaughlin
Attorney

United States Patent Office 2,760,819
Patented Aug. 28, 1956

2,760,819

IRRIGATING AND FERTILIZING DEVICE

Harry L. Thomas, Tucson, Ariz.

Application May 5, 1954, Serial No. 427,821

6 Claims. (Cl. 299—83)

My invention relates to irrigating and fertilizing devices and more in particular to a relatively small device which may be placed on the end of an ordinary garden hose or the like to carry plant nutrient material, and also to markedly decrease water pressure at the point of delivery without decreasing the delivered water volumetrically, whereby to prevent erosion and introduce plant nutrient material during irrigation.

In the watering of flower beds, lawns, relatively small garden plots and the like, a common practice is to use a sprinkler, of which many types have been in use. In recent years, however, it has been found that a marked advantage is obtained if a greater volume of water is introduced at or around the roots of plants instead of being sprinkled over them. Among the advantages are less damage to foliage and flowers, development of better root systems, and actually the use of less water because with deeper watering the moisture is conserved, sometimes for many days, and watering is required only once or twice a week even in hot weather. A further advantage may be obtained, moreover, if suitable plant nutrient material may be introduced to the roots during the watering or irrigating process.

One of the problems has been to deliver a relatively large volume of water to a plot to be irrigated without rather thoroughly washing away part of the soil, forming holes and ruts, and in other ways generally damaging the terrain. Irrigating devices functioning to reduce pressure while not restricting flow have been suggested in the past, among them the irrigator shown in my prior Patent No. 2,644,719. Devices of the prior art, however, while they reduce pressure while not restricting flow, are ineffective in several respects, particularly from the standpoint of bringing fertilizer to the plant roots during watering.

The principal object of my invention, therefore, is the provision of an improved irrigating device in which relatively high pressure water may be received and delivered in maximum volume to a point of use at substantially no pressure, to thereby produce maximum water supply and substantially eliminate soil erosion.

Another object of the invention is the provision of such an irrigating device which may be produced economically and thereby sell at a low cost.

Still another and important object of my invention is to provide an irrigating device which may also be used to apply fertilizer to the plant roots.

Other objects and specific features of my invention will be apparent from the following detailed description taken with the accompanying drawings, wherein:

Fig. 1 is an elevational view on a reduced scale showing a preferred form of the device of my invention;

Fig. 2 is a sectional view thereof taken on the line 2—2 of Fig. 1, the said Fig. 2 being enlarged to substantially full-scale;

Fig. 3 is a sectional view taken on the line 3—3 of Fig. 2;

Fig. 4 is an expanded sectional view showing the parts before assembly in substantially the positions which they occupy after they are put together; and Fig. 5 is an elevational view showing a type of hose connection which may be used.

Referring now to the drawings, the principal parts of the device of my invention comprise an outer tubular member 10, an inner tubular member 11 spaced therefrom but co-axially therewith, an end imperforate cap 12, and an end cap 13 imperforate except for a central opening provided therein to which a hose connection 14 is attached for introducing water under pressure to the interior of the inner tubular member 11.

The outer tubular member 10 has a plurality of relatively small openings 16 therein, and it is preferably formed from a strip of metal cut to suitable length and formed on itself with its ends secured together by eyelet rivets 17, a single center flute or corrugation 18 being utilized to increase strength at the center portion.

The inner tubular member 11 is formed of identical, semi-cylindrical portions 19, also preferably stamped from a strip of metal, each having formed a pair of parallel edge cuts 21 as shown particularly in Fig. 1 to form three separate tabs, including center tab 22 and end tabs 23. Each of the sections 19 has a plurality of holes 24 near one end thereof. When the tabs 22 and 23 are formed, the tab 22 is displaced in one direction from the normal arc of curvature and the tabs 23 in the opposite direction to form a slot between them into which the contiguous edge 26 of the opposite semi-cylindrical section 19 may extend when the two sections are brought together. By bringing the sections together in this fashion and clamping down with a suitable tool on the overlapped portions, including the tabs 22 and 23, a substantially self-supporting cylinder is formed with overlapping portions, as shown clearly in Fig. 3.

The end caps are substantially identical except for the aperture in 13, but they will be described separately to facilitate description of the method of assembly and the flow of water in the completely assembled device.

The end cap 12 comprises a generally cylindrical skirt section 27, a center generally dish-shaped portion 28, and an annular indentation 29 forming a ring-like outer projection 31 between the indentation 29 and the skirt 27. A slightly recessed shoulder 32 is formed just above the skirt 27. In production I have found that the cap 12 may be formed in a very simple manner by first drawing a general dish-like structure from sheet metal which would be generally parabolic in half cross-section, and then forming the skirt 27, recess 29 and shoulder 32 by one of several types of procedures, suitably spinning against a formed tool held against the exterior. The result of this structure is to form a recess for positioning the outer tubular member 10 and, as appears clearly from Fig. 2, to form a positioning recess for the inner tubular member 11 during assembly.

Looking at the cap 13 as it appears in Fig. 4, I also provide a dish-like portion 33, recess 34, skirt 36, recessed shoulder 37, and ring-like projection 38, all generally similar to corresponding members in the cap 12. A center round aperture 39, however, is provided into which a tubular projection 41 of the coupling 14 extends; and to complete showing of the parts, I also indicate in section in Fig. 4 a washer 42 which functions as will be described later.

In assembling the device of my invention, the hose connection 14 is first assembled to the cap 13 by inserting the tubular projection into the aperture 39, the washer 42 placed over the inwardly projecting portion, and the projection 41 spun over in the manner indicated in Fig. 2. The two caps 12 and 13 are then assembled in a spinning jig on opposite ends of the inner and outer tubular members 11 and 10, respectively. The tubular members are held in co-axial relation, the member 11 by the ring-like outer projections 31 and 38 and the outer tubular member 10 by the skirts 27 and 36 and the recessed shoulders 32 and 37. While the parts are so held and spun, a suitable tool is brought in against the edges of skirts 27 and 36. The recesses in the shoulders 32 and 37 hold the end edges 43 and 44 and prevent their being depressed inwardly by the spinning tool. Instead, the skirt edges and portions of the tubular member 10 immediately below the edges 43 and 44 are spun inwardly, producing in effect edge flares on the tubular member 10 around which the spun-in edges of the skirts 27 and 36 extend to hold the parts in assembled relation.

In producing the device of my invention, the hose connection 14 may be, for example, brass, and optionally a standard purchased part. The washer 42 is preferably of a hard material such as steel; and if steel is used, suitable rust-inhibiting treatment should be applied to it. The remaining parts are made of sheet aluminum or other non-corrosive metal. I have found that dead soft aluminum sheet may be used; and when formed in the manner described, an amply strong, rust proof, relatively inexpensive structure is formed.

One of the advantages of the device of my invention is that a plant nutrient material—as, for example, in the form of round pellets 45, or any other suitable form—may be introduced into the inside of the inner tubular member 11 through the opening at the hose connection 14. The number of pellets may be substantially sufficient to fill the inner tubular member without appreciably affecting the water action, and the water action seems to have some effect in preventing the pellets from closing the openings 24. The plant nutrient material may vary, but preferably it is highly concentrated and sufficiently compacted so that it dissolves slowly from the surface and is carried in dilute form into contact with the plant roots.

The water action of my present device is markedly different from that in which baffles are used, as shown in my prior patent, but improved results are obtained in decreasing pressure while permitting full volume flow. The water entering through the hose connection has a boring action until it reaches the center of cap 12, where it is turned back on itself and flows along the outside in the form of a cylinder, hugging the inside cylindrical wall of the inner tubular member 11. At the bottom end of its travel, assuming the device is in the position shown in Fig. 2, the water escapes through the openings 24 which in the aggregate have of course many times the cross-sectional area of the garden hose. From the openings 24 the water engages the curved surface of the ring-like projection 38 and is diverted upwardly (still looking at Fig. 2) close to the outer cylindrical surface of the inner tubular member 11 until it reaches the outwardly flared surface of the ring-like projection 31, where it is turned back downwardly and permitted to flow through the very large number of holes 16 with their total area very much in excess of the original cross-sectional area.

While there is some turbulence observable in the space between the inner and outer tubular members, I have found there is a distinct path of water upwardly on the inside and downwardly on the outside as the device is held in the position indicated in Fig. 2. Regardless of the path which the water takes, however, it flows by expansion out through all of the openings 16, including the opening on top, when the device is resting on the ground in a horizontal position; and a maximum flow of water is obtained with no pressure such as to cause erosion of surrounding soil.

I have described my invention in detail so that those skilled in the art may understand the same, but the scope of the invention is defined in the claims.

I claim:

1. In an irrigating device, an outer, generally tubular member; an inner, generally tubular member coaxial with and spaced from said outer tubular member; a pair of generally hemispherical end caps closing ends of said tubular members; and a base coupling secured in a center aperture in one of said end caps whereby to permit introduction of water under pressure into said inner tubular member; said end caps being imperforate except for said coupling aperture, said inner tubular member having a plurality of openings at one extreme end thereof to admit water at reduced pressure to space between the inner and outer tubular members; and a plurality of openings over a major area of said outer tubular member to further reduce pressure of water passing therethrough.

2. In an irrigating device, an outer, generally tubular member; an inner, generally tubular member coaxial with and spaced from said outer tubular member; a pair of generally hemispherical end caps closing ends of said tubular members; and a base coupling secured in a center aperture in one of said end caps whereby to permit introduction of water under pressure into said inner tubular member; said end caps being imperforate except for said coupling aperture, said inner tubular member having a plurality of openings at the extreme end thereof adjacent the said coupling and a plurality of openings over a major area of said outer tubular member whereby a water path is defined generally from the coupling aperture to the opposite end cap, from said cap along sides of the inner tubular member to the openings therein, through said openings into contact with a curved portion of the adjacent end cap to force the same along the outside portion of the inner tubular member, and thence at greatly reduced pressure through said outer openings.

3. In an irrigating device, a pair of end caps, each having an annular, generally clindrical skirt and a positioning annular recess coaxial with said skirt; an inner, tubular member with ends set in said positioning recesses; an outer, tubular member having its end edges outwardly flared, said skirts being slanted inwardly to engage said flared portions and hold the combination of two end caps and inner and outer tubular members in assembled relation; one said end cap having a center recess and a base coupling secured in said recess whereby to introduce water into the interior of said inner tubular member; said inner and outer tubular members having a plurality of differentially placed openings to permit discharge of reduced pressure water through openings in the outer tubular member.

4. The combination defined in claim 3 wherein said holes in the inner tubular member are placed at that end thereof contiguous to said base coupling and aligned with a wall of said positioning recess, and said holes in the outer cylindrical member are much larger in number and extend over a major surface of said member not aligned with holes in said inner tubular member.

5. The combination defined in claim 3 wherein said inner tubular member comprises identical, generally semi-cylindrical members, each with parallel cut edges forming a plurality of tabs engaging opposite sides of an opposed member to hold the two semi-cylindrical members together.

6. In an irrigating device, an inner tubular member having a relatively small number of openings therein, said inner tubular member adapted to retain solid discrete pieces of plant nutrient material, an outer tubular member having a relatively large number of openings therein, caps secured on ends of said outer tubular member and engaging the inner tubular member to hold them in assembled generally co-axial relation, and a hose coupling secured to one such cap and providing an entrance way for water and said solid plant nutrient material.

References Cited in the file of this patent

UNITED STATES PATENTS

| | | |
|---|---|---|
| 1,388,136 | Whitney | Aug. 16, 1921 |
| 2,420,958 | Landreth | May 20, 1947 |